United States Patent
Steger et al.

(10) Patent No.: US 7,228,274 B2
(45) Date of Patent: Jun. 5, 2007

(54) RECOGNITION OF IDENTIFICATION PATTERNS

(75) Inventors: Johann Steger, Munich (DE); Michael Weber, Freising (DE)

(73) Assignee: Infineon Technologies AG, Munich (DE)

( * ) Notice: Subject to any disclaimer, the term of this patent is extended or adjusted under 35 U.S.C. 154(b) by 753 days.

(21) Appl. No.: 10/416,113

(22) PCT Filed: Dec. 13, 2001

(86) PCT No.: PCT/EP01/14700

§ 371 (c)(1),
(2), (4) Date: May 7, 2003

(87) PCT Pub. No.: WO02/51168

PCT Pub. Date: Jun. 27, 2002

(65) Prior Publication Data

US 2004/0024587 A1    Feb. 5, 2004

(30) Foreign Application Priority Data

Dec. 18, 2000 (DE) ................................ 100 63 079

(51) Int. Cl.
*G10L 10/00* (2006.01)

(52) U.S. Cl. ............... 704/230; 704/229; 704/219; 704/233

(58) Field of Classification Search ........ 704/226–233, 704/219
See application file for complete search history.

(56) References Cited

U.S. PATENT DOCUMENTS

| 5,499,246 | A  |   | 3/1996  | Cooper |
|-----------|----|---|---------|--------|
| 5,633,980 | A  | * | 5/1997  | Ozawa ..................... 704/200.1 |
| 5,671,227 | A  |   | 9/1997  | Keller et al. |
| 5,751,903 | A  | * | 5/1998  | Swaminathan et al. ..... 704/230 |
| 5,881,105 | A  | * | 3/1999  | Balachandran et al. ..... 375/259 |
| 5,905,733 | A  |   | 5/1999  | Sölve et al. |
| 5,940,412 | A  |   | 8/1999  | Koivu |
| 6,212,660 | B1 |   | 4/2001  | Joeressen et al. |
| 6,233,708 | B1 | * | 5/2001  | Hindelang et al. .......... 714/747 |
| 6,249,759 | B1 | * | 6/2001  | Oda ........................... 704/222 |
| 6,324,509 | B1 | * | 11/2001 | Bi et al. ..................... 704/248 |
| 6,535,847 | B1 | * | 3/2003  | Marston ..................... 704/227 |
| 6,574,593 | B1 | * | 6/2003  | Gao et al. .................. 704/222 |
| 6,961,698 | B1 | * | 11/2005 | Gao et al. .................. 704/229 |
| 7,054,809 | B1 | * | 5/2006  | Gao ........................... 704/229 |

FOREIGN PATENT DOCUMENTS

| DE | 4429595  | 8/1994 |
|----|----------|--------|
| DE | 19736434 | 3/1999 |

* cited by examiner

*Primary Examiner*—Vijay Chawan
(74) *Attorney, Agent, or Firm*—Fish & Richardson P.C.

(57) ABSTRACT

The invention relates to a method and to a device for identifying markers in data blocks. The method is characterized in that a number of data blocks (201a 201n) are received by a receiver (202) and one specific data block from the number of data blocks (201a 201n) is analyzed in order to determine whether the specific data block contains a marker (203) or not. Once a data block that contains a marker (203) is identified, a full-rate signaling block (206) that is transmitted at full rate and a half-rate signaling block (207) that is transmitted at half rate are searched for markers. A predetermined reference pattern is provided for correlation that is subsequently divided into sub-ranges that in turn are correlated with a predetermined reference pattern to identify a signaling frame in the full-rate signaling blocks (206) and/or the half-rate signaling blocks (207).

12 Claims, 3 Drawing Sheets

RECOGNITION OF IDENTIFICATION PATTERNS

FIELD OF INVENTION

The present invention relates to a method for recognition of identification patterns, and in particular to a method which recognizes all the important identification patterns in one or more signaling frames.

BACKGROUND

The signaling is provided in signaling frames which are in turn transmitted in a data band instead of speech frames.

A data receiver—referred to for short in the following text as a "receiver"—must be able to distinguish between the signaling frames mentioned above and speech frames.

In the method according to the prior art, this distinction is made with the aid of specific identification patterns (also referred to as "markers"). A protocol for signaling is specified in conventional data transmission channels. The signaling is used, for example, for:

a) fixing different data rates;
b) switching between different data rates; and
c) DTX (discrete transmission) handling.

In general, with mixed digital transmission of speech data and other data, received data blocks must be analyzed in an appropriate receiver. In order to save computation time and in order to ensure a high transmission rate, this analysis must be carried out as efficiently and quickly as possible at the receiver end.

In order to distinguish between data blocks which transmit only speech information and are therefore referred to in the following text as speech blocks, and data blocks which transmit other data or receiver-specific information, for example the switching between different speech codes, and are thus referred to in the following text as signaling blocks, conventional receiver-end analysis systems use specific identification patterns or "markers" in order to identify signaling frames which are contained in the signaling blocks.

FIG. 4 shows a schematic flowchart of a method for recognition of identification patterns according to the prior art, in which received data blocks 201 are searched sequentially in full rate signaling blocks 206, with full rate signaling frames 208a–d being set successively for identification patterns. 401 in this case denotes a decision device for jumping back to the next full rate signaling block 206, and 103 denotes a result output step.

SUMMARY

This method has the major disadvantage that a separate search must be carried out after each signaling frame, and this results in a large amount of time being lost as a result of the long computation time.

A further disadvantage of conventional methods is the necessity to carry out deinterleaving and recognition of identification patterns more than once.

Yet another disadvantage of conventional methods is that all the signaling frames must be searched for separately.

The method on which the invention is based has the major advantage that identification patterns in signaling frames are recognized by means of a single correlation so that there is no need to search each signaling frame or to carry out a deinterleaving process and recognition of identification patterns more than once, thus making it possible to save a considerable amount of computation time.

The essence of the invention is a method for recognition of identification patterns in data blocks which have been received by means of receivers, in order to distinguish between speech frames and signaling frames, with correlation being subdivided using predetermined reference patterns, and symmetries in the reference patterns to be analyzed being used for recognition.

According to one preferred development of the method according to the invention, mutually inverted identification patterns need be evaluated only once, in order to save computation time.

According to a further preferred development of the method according to the invention, one or more of the transmitted data blocks is a speech block or are speech blocks which contain a speech frame or speech frames.

According to yet another preferred development of the method according to the invention, one or more of the data blocks is a signaling block or are signaling blocks which contains or contain a signaling frame or signaling frames.

According to yet another preferred development of the method according to the invention, deinterleaving is carried out only once.

According to yet another further preferred development of the method according to the invention, a full rate signaling block contains one or more types of full rate signaling frames.

According to yet another preferred development of the method according to the invention, a half rate signaling block contains one or more types of half rate signaling frames.

According to yet another preferred development of the method according to the invention, a sequence controller decides whether to use a calculated correlation value.

According to yet another preferred development of the method according to the invention, a speech block is transmitted by means of a full rate speech block.

According to yet another preferred development of the method according to the invention, a speech block is transmitted by means of a half rate speech block.

BRIEF DESCRIPTION OF THE DRAWINGS

Exemplary embodiments of the invention will be explained in more detail in the following description and are illustrated in the drawings, in which.

Identical reference symbols in the figures denote identical or functionally identical components and sequence blocks of the method according to the invention.

DETAILED DESCRIPTION

Figure 1:
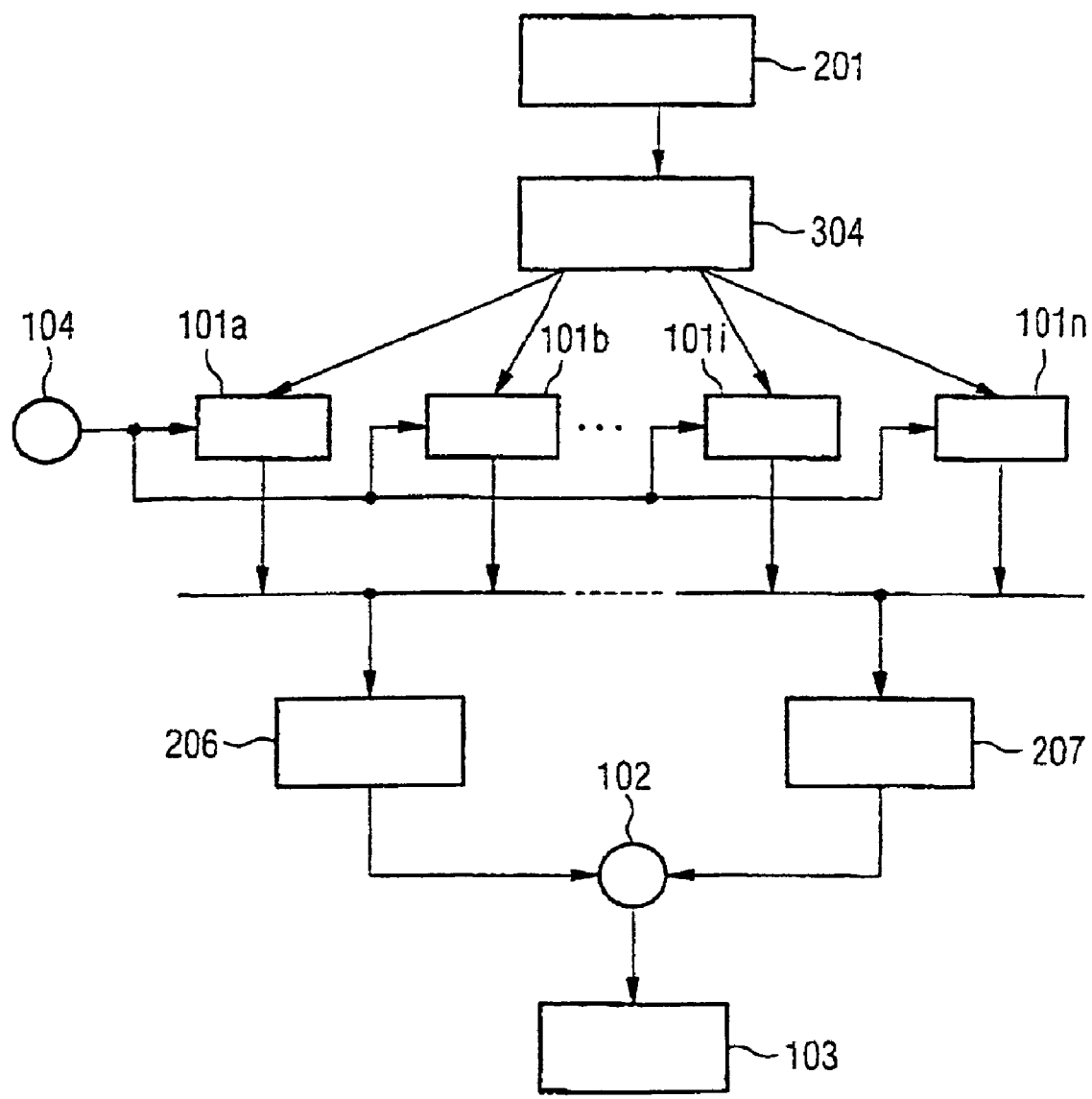
FIG. 1 shows a flowchart of the method for recognition of identification patterns according to the present invention.

FIG. 1 shows a flowchart of the method for adaptive recognition of identification patterns in data blocks, in order to determine signaling frames, according to the present invention, in which the illustrated sequence shows, by way of example, the investigation of a data block, in this case the data block 201b.

Figure 2:
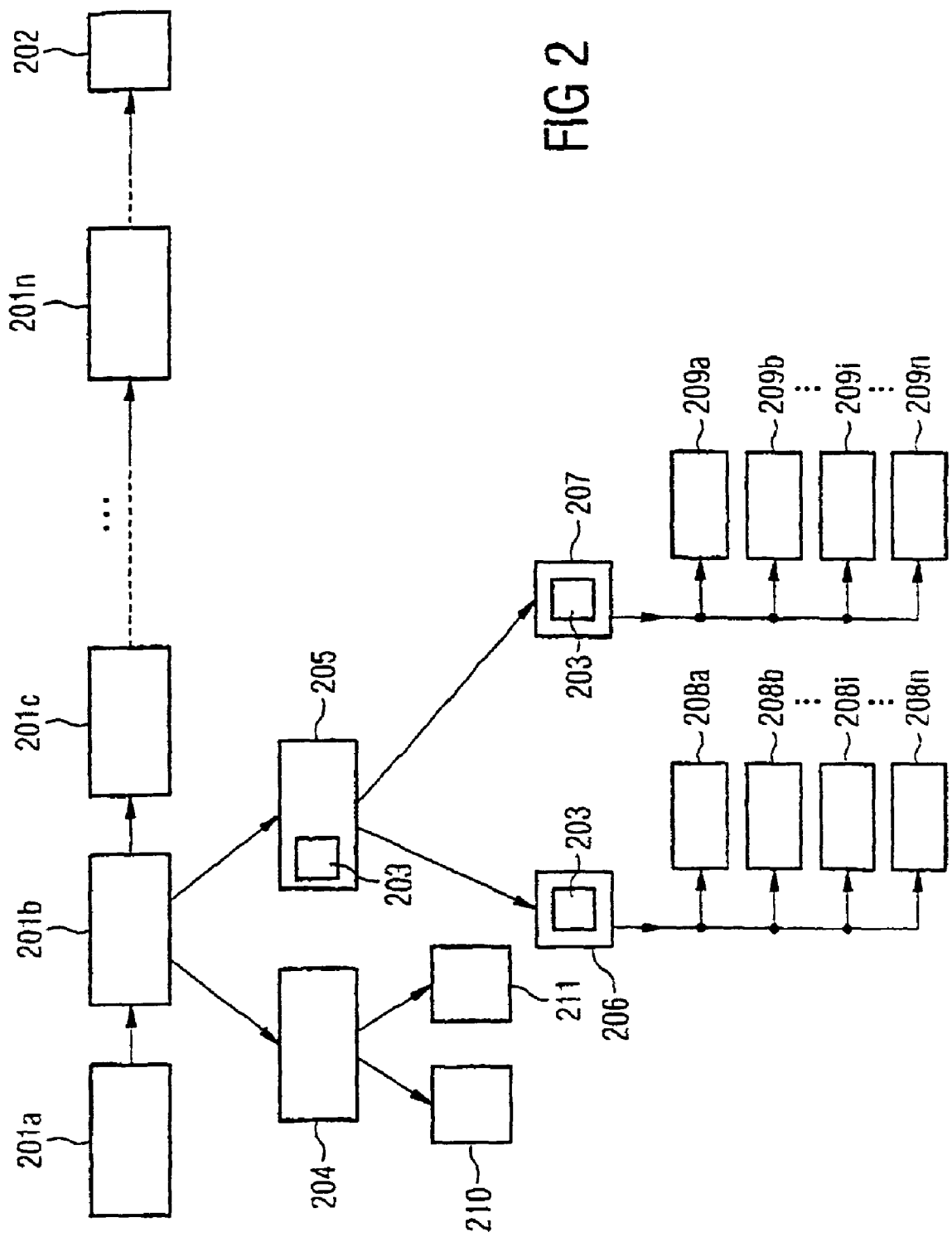
FIG. 2 shows a block diagram illustrating the transmission of data blocks to a receiver, and providing a summary of the contents of data blocks.

A series of data blocks 201a–201n (FIG. 2), where the index n indicates the maximum number of data blocks under consideration, is transmitted from a transmitter (not shown) to a receiver 202 (FIG. 2). The data blocks may contain either speech information or signaling information. Owing to the different requirements for further processing of the data depending on whether the data is speech information or signaling information, it is necessary to reliably distinguish between data blocks which contain speech information and data blocks which contain signaling information.

In this context, reference is also made to FIG. 2, which shows a block diagram illustrating the transmission of data blocks to a receiver, and provides a summary of the contents of data blocks. Once a specific data block from a series of data blocks 201a to 201n has been received, this specific data block is analyzed in order to determine whether this specific data block, which is illustrated as a data block 201b in FIG. 2, does or does not contain an identification pattern 203.

A data block which does not contain an identification pattern 203 is then identified as a speech block 204 and is processed further in accordance with the requirements for speech information processing. In contrast to this, a data block which does contain an identification pattern 203 is identified as a signaling block 205. Furthermore, a search is carried out for identification patterns in a full rate signaling block 206 which is transmitted at a full rate, and a search is carried out for identification patterns in a half rate signaling block 207, which is transmitted at a half rate.

Figure 3:
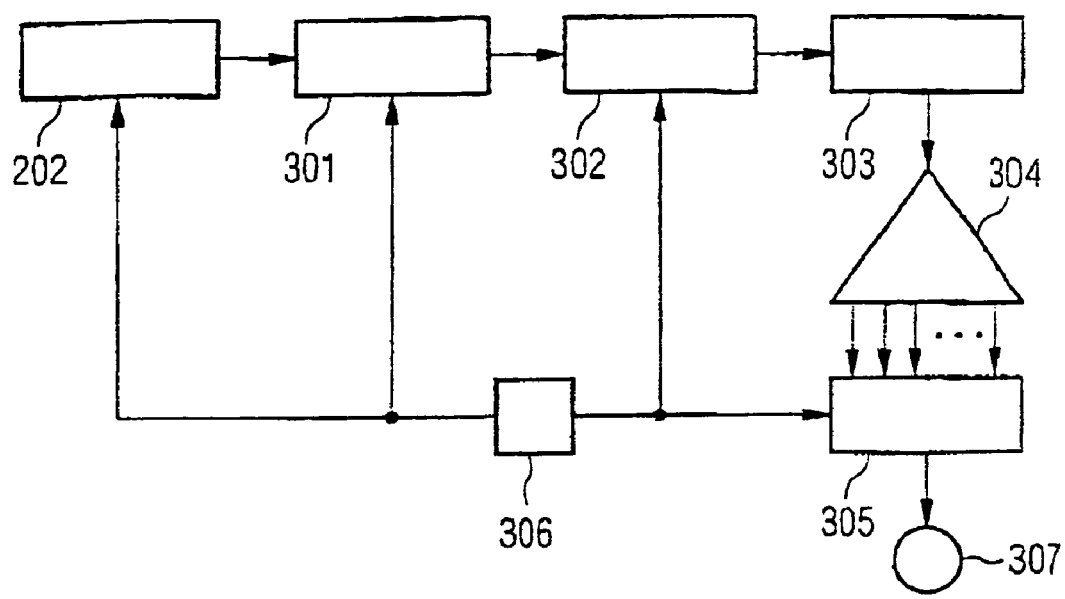
FIG. 3 shows a block diagram illustrating an apparatus for recognition of identification patterns according to the present invention.
Figure 4:
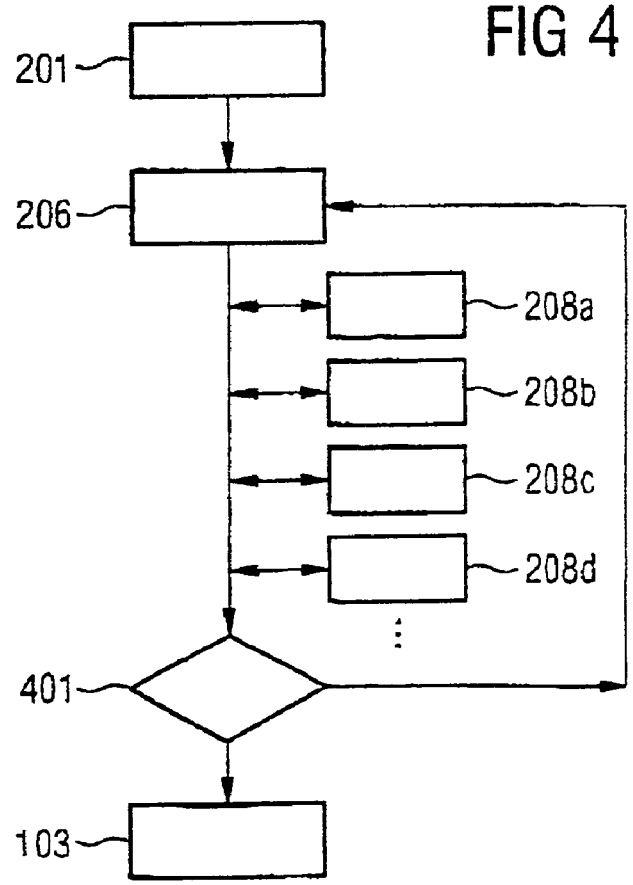
FIG. 4 shows a flowchart of a method for recognition of identification patterns according to the prior art.

According to this embodiment of the method, the search for the respective identification patterns is carried out by means of a correlation method, with the correlation process being subdivided into individual correlation steps 101a to 101n using a correlation subdivision device 304 (FIG. 3). In this case, a predetermined reference pattern 104 is provided for the individual correlation steps 101a to 101n, and is processed at the same time in the individual correlation steps 101a to 101n. This procedure considerably speeds up a recognition process for identification patterns in comparison to methods according to the prior art, in which complete correlations need to be carried out successively, as explained above with reference to FIG. 4. Once the correlation process has been subdivided into subareas which are each correlated with the predetermined reference pattern 104—at the same time—individual full rate signaling frames 208a to 208n are found in the full rate signaling blocks 206, and/or half rate signaling frames 209a to 209n are found in the half rate signaling blocks 207, following which correlation values 307 (FIG. 3) are output in order to indicate signaling frames which have been found.

A sequence controller 306, which is illustrated in FIG. 3, decides which correlation value will be used.

FIG. 3 shows a block diagram illustrating an apparatus for adaptive recognition of identification patterns in data blocks in order to determine signaling frames. A data block 201 to be analyzed is output to an analysis device 301 once it has been received by the receiver 202, with the assumption being made in this exemplary embodiment that any of the data blocks 201a to 201n can be analyzed. The analysis device 301 analyzes a specific data block from the series of data blocks 201a–201n in order to determine whether the specific data block does or does not contain an identification pattern 203. The specific data block is then supplied to an identification device 302, in order to identify a data block which does not contain an identification pattern 203 as a speech block 204, and in order to identify a data block which does contain an identification pattern 203 as a signaling block 205.

The output signal from the identification device 302 is then supplied to a correlation device 303 in order to search for identification patterns in a full rate signaling block 206, which is transmitted at a full rate, and to search for identification patterns in a half rate signaling block 207, which is transmitted at a half rate, which are contained in the full rate signaling block 206 and/or in the half rate signaling block 207, by means of correlation with reference patterns 104. A correlation subdivision device 304 then subdivides the correlation process into subareas which in turn are correlated with a predetermined reference pattern in order to find signaling frames in the full rate signaling blocks 206 and/or in the half rate signaling blocks 207.

An output device 305 is used for outputting correlation values in order to indicate the signaling frames which have been found. A sequence controller 306 controls an operating sequence and, as already mentioned, decides which correlation values 307 will be output in a current state.

Although the present invention has been described above on the basis of preferred exemplary embodiments, it is not restricted to them but can be modified in many ways.

List of Reference Symbols

Identical reference symbols denote identical or functionally identical components in the figures.

| | |
|---|---|
| 101a, . . . , 101n | Individual correlation steps |
| 102 | Evaluation step |
| 103 | Result output step |
| 104 | Reference pattern |
| 201, 201a, . . . , 201n | Data blocks |
| 202 | Receiver |
| 203 | Identification pattern |
| 204 | Speech block |
| 205 | Signaling block |
| 206 | Full rate signaling block |
| 207 | Half rate signaling block |
| 208a, . . . , 208n | Full rate signaling frames |
| 209a, . . . , 209n | Half rate signaling frames |
| 210 | Full rate speech block |
| 211 | Half rate speech block |
| 301 | Analysis device |
| 302 | Identification device |
| 303 | Correlation device |
| 304 | Correlation subdivision device |
| 305 | Output device |
| 306 | Sequence controller |
| 307 | Correlation values |
| 401 | Decision device |

The invention claimed is:

1. A method for recognizing identification patterns in data blocks to determine signaling frames, the method comprising:

receiving a series of data blocks in a receiver, the series of data blocks including at least one data block that includes speech information and at least one data block that includes signaling information;

analyzing a specific data block from the series of data blocks to determine whether the specific data block contains an identification pattern;

identifying a data block lacking an identification pattern as a speech block;

identifying a data block containing an identification pattern as a signaling block;

searching for identification patterns in a full rate signaling block;

searching for identification patterns in a half rate signaling block;

providing a predetermined reference pattern for correlation;

sub-dividing the correlation into subareas;

correlating the subareas by a predetermined reference pattern, to find signaling frames in at least one of the full rate signaling blocks and-the half rate signaling blocks; and outputting correlation values to indicate signaling frames have been found.

2. The method according to claim 1, further comprising evaluating mutually inverted identification patterns only once to save computation time.

3. The method according to claim 1, further comprising providing a sequence controller to decide which correlation value to use.

4. The method according to claim 1, herein at least one of the data blocks is a speech block that contains a speech frame.

5. The method according to claim 1, wherein at least one of the data blocks is a signaling block that contains a signaling frame.

6. The method according to claim 1, further comprising deinterleaving only once.

7. The method according to claim 1, wherein the full rate signaling block contains at least one type of full rate signaling frame.

8. The method according to claim 1, wherein the half rate signaling block contains at least one type of half rate signaling frames.

9. The method according to claim 1, further comprising providing a sequence controller to decide whether to use a calculated correlation value.

10. The method according to claim 1, farther comprising transmitting the speech block by means of a full rate speech block.

11. The method according to claim 1, further comprising transmitting the speech block by means of a half rate speech block.

12. An apparatus for recognizing identification patterns in data blocks to determine signaling frames, the apparatus comprising:

a receiver for receiving a series of data blocks;

an analysis device for analyzing a specific data block from the series of data blocks that includes at least one data block that includes speech information and at least one data block that includes signaling information to determine whether the specific data block contains an identification pattern;

an identification device for identifying a data block that does not contain an identification pattern as a speech block, and for identifying a data block that does contain an identification pattern as a signaling block;

a correlation device for searching for identification patterns in a full rate signaling block and in a half rate signaling block by correlation with a reference pattern;

a correlation subdivision device for subdividing the correlation into subareas, which in turn are correlated with a predetermined reference pattern, to find signaling frames in at least one of the full rate signaling blocks and the half rate signaling blocks;

an output device for outputting correlation values to indicate signaling frames that have been found; and a sequence controller for controlling an operating sequence and for deciding which correlation values are output in a current state.

* * * * *